US008226027B2

(12) United States Patent
Journade et al.

(10) Patent No.: US 8,226,027 B2
(45) Date of Patent: Jul. 24, 2012

(54) ENGINE ASSEMBLY FOR AIRCRAFT WITH SLIDING NACELLE

(75) Inventors: Frederic Journade, Toulouse (FR); Laurent Lafont, Pechbusque (FR)

(73) Assignee: Airbus Operations (Societe par Actions Simplifiee), Toulouse (FR)

( * ) Notice: Subject to any disclaimer, the term of this patent is extended or adjusted under 35 U.S.C. 154(b) by 272 days.

(21) Appl. No.: 12/601,355

(22) PCT Filed: May 30, 2008

(86) PCT No.: PCT/EP2008/056680
§ 371 (c)(1),
(2), (4) Date: Nov. 23, 2009

(87) PCT Pub. No.: WO2008/145725
PCT Pub. Date: Dec. 4, 2008

(65) Prior Publication Data
US 2010/0170984 A1    Jul. 8, 2010

(30) Foreign Application Priority Data

Jun. 1, 2007  (FR) ...................................... 07 55409

(51) Int. Cl.
*B64D 27/00* (2006.01)
*B64D 29/06* (2006.01)
(52) U.S. Cl. ...................... 244/54; 244/110 B; 244/1 N
(58) Field of Classification Search .................. 244/1 N, 244/54, 110 B, 129.4
See application file for complete search history.

(56) References Cited

U.S. PATENT DOCUMENTS

| 3,067,968 | A | * | 12/1962 | Heppenstall | 244/53 R |
| 3,614,037 | A | * | 10/1971 | Vdolek | 244/110 B |
| 3,829,020 | A | * | 8/1974 | Stearns | 181/216 |
| 4,228,651 | A | | 10/1980 | Mullins | |
| 4,373,328 | A | | 2/1983 | Jones | |
| 4,442,987 | A | * | 4/1984 | Legrand et al. | 244/110 B |
| 4,600,619 | A | * | 7/1986 | Chee et al. | 428/118 |
| 5,035,379 | A | * | 7/1991 | Hersen et al. | 244/129.4 |
| 5,060,471 | A | * | 10/1991 | Torkelson | 60/262 |
| 5,228,641 | A | * | 7/1993 | Remlaoui | 244/110 B |
| 5,782,082 | A | * | 7/1998 | Hogeboom et al. | 60/226.1 |
| 5,806,302 | A | * | 9/1998 | Cariola et al. | 244/110 B |
| 5,975,237 | A | * | 11/1999 | Welch et al. | 181/290 |
| 6,170,254 | B1 | * | 1/2001 | Cariola | 60/226.2 |
| 6,179,249 | B1 | * | 1/2001 | Canadas | 244/53 R |
| 6,340,135 | B1 | * | 1/2002 | Barton | 244/54 |
| 6,557,799 | B1 | * | 5/2003 | Sternberger | 244/110 B |

(Continued)

FOREIGN PATENT DOCUMENTS

EP    0 540 193 A1    5/1993

(Continued)

*Primary Examiner* — Timothy D Collins
*Assistant Examiner* — Steven Hawk
(74) *Attorney, Agent, or Firm* — Oblon, Spivak, McClelland, Maier & Neustadt, L.L.P.

(57) ABSTRACT

An aircraft engine assembly including a turbojet, a turbojet attachment pylon, and a nacelle mounted on the attachment pylon and surrounding the turbojet. The nacelle includes at least one mobile nacelle portion forming a single piece envelope all around a section of the turbojet, this mobile nacelle portion being mounted free to slide on the attachment pylon so that it can be moved from the forward position in the aft direction, and vice versa.

11 Claims, 6 Drawing Sheets

U.S. PATENT DOCUMENTS

| | | | |
|---|---|---|---|
| 7,789,347 B2 * | 9/2010 | Oberle et al. | 244/129.4 |
| 2006/0145001 A1 * | 7/2006 | Smith | 244/110 B |
| 2008/0224018 A1 | 9/2008 | Lafont et al. | |
| 2008/0245926 A1 | 10/2008 | Journade et al. | |
| 2008/0251633 A1 | 10/2008 | Journade et al. | |

FOREIGN PATENT DOCUMENTS

| | | |
|---|---|---|
| FR | 1 579 651 | 8/1969 |
| FR | 2 349 738 | 11/1977 |
| WO | WO 2008/102068 A1 | 8/2008 |

* cited by examiner

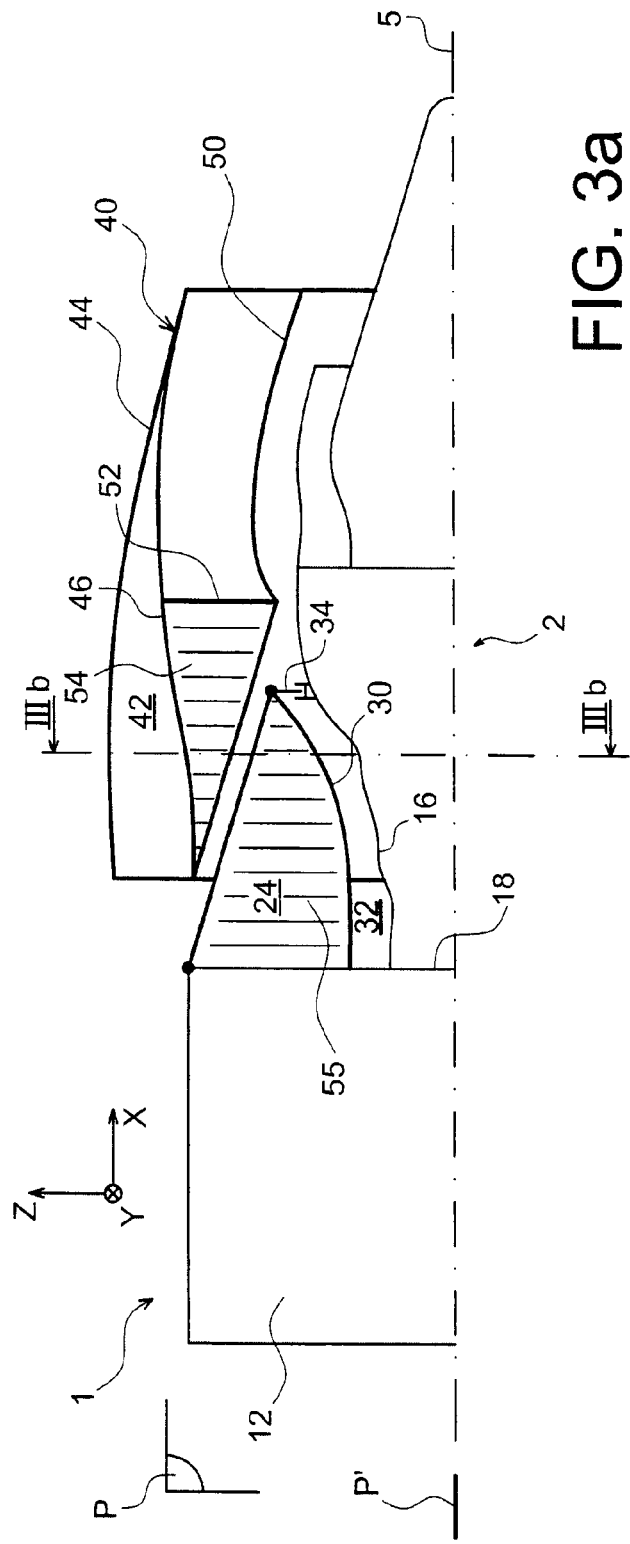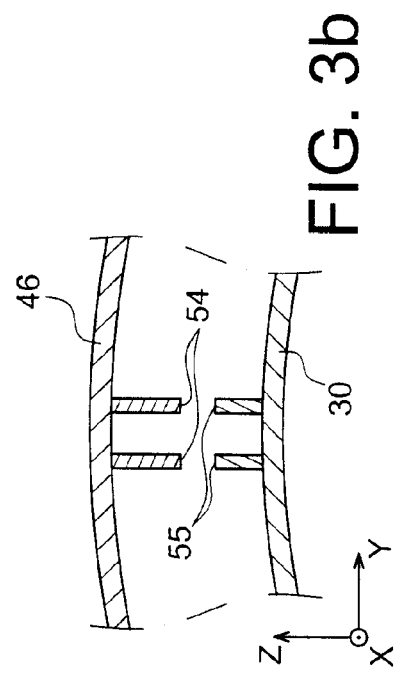

ENGINE ASSEMBLY FOR AIRCRAFT WITH SLIDING NACELLE

TECHNICAL DOMAIN

This invention relates in general to an aircraft engine assembly of the type including a turbojet, an attachment pylon and a nacelle mounted on the attachment pylon and surrounding the turbojet.

This type of attachment pylon, also called an "EMS" (Engine Mounting Structure), can for example be used to suspend a turbojet below the aircraft wing, or to mount this turbojet above this wing, or to mount a turbojet on an aft part of the fuselage.

STATE OF PRIOR ART

The attachment pylon for such an engine assembly is designed in a known manner to form the connection interface between a turbojet type engine and an aircraft wing equipped with this assembly. It transmits forces generated by its associated engine to the structure of this aircraft, and also enables routing of fuel, electrical, hydraulic and air systems between the engine and the aircraft.

In order to transmit forces, the pylon comprises a rigid structure, for example a "box" type structure, in other words that is formed by the assembly of spars and side panels connected to each other through transverse ribs.

A mounting system is installed between the engine and the rigid structure of the pylon, this system globally comprising a plurality of engine attachments, usually distributed to have forward attachment(s) fixed to the engine fan casing and aft attachment(s) fixed to the central casing of this same engine.

The mounting system also comprises a system for resisting thrusts generated by the engine. In prior art, for example this device is in the form of two side rods connected firstly to an aft part of the engine fan casing, and secondly to an attachment mounted on the rigid structure of the pylon, for example an aft attachment.

For information, it is specified that the attachment pylon is associated with a second mounting system located between this pylon and the aircraft wing, this second system normally being composed of two or three attachments.

Finally, the pylon is provided with a secondary structure to segregate and maintain systems while supporting aerodynamic fairings.

These aerodynamic fairings form an almost continuous assembly with the engine assembly nacelle, this nacelle fixed to the pylon being provided around the turbojet.

In a manner known to those skilled in art, the nacelle normally comprises articulated C-shaped covers fixed to the primary/rigid structure of the pylon. These covers usually support engine thrust inversion systems. The covers can be opened to enable access to the engine body for maintenance operations, and so that the engine can be removed vertically.

The two C-shaped covers are stiffened by completing the hinge-lock system with compression rods, or bumpers, these bumpers being globally arranged at the hinges and locks between the ends facing the covers in pairs. Note that the stiffness can sometimes be increased slightly by replacing all or some of the compression rods by offset actuators or locks, to transfer tension forces applied along the transverse direction of the engine assembly.

Although this design is very commonly used, it has some disadvantages, including the lack of stiffness of the nacelle, and the fact that the nacelle is not optimally treated acoustically.

The structural capacity of the nacelle to attenuate deformations of the turbojet is intrinsically limited by the force concentration at closing elements such as the hinges, locks, compression rods and other offset actuators or locks. Thus, the nacelle cannot satisfactorily resist deformations of the turbojet, and particularly the variable magnitude of longitudinal bending, namely bending due to a torque applied about a transverse direction of the aircraft, if its stiffness is limited.

When such longitudinal bending occurs, particularly during the aircraft takeoff and landing phases, high friction can occur between the rotating blades of the compressor and the turbine, and the central casing of the engine. Large nominal clearances must be provided between the blades and the casing to prevent this friction, but this is prejudicial to the global performances of the aircraft.

Note also that the above-mentioned longitudinal bending phenomena, and therefore the phenomenon of friction of the rotating blades, is very much accentuated by the fact that the search for an ever-increasing dilution ratio on existing turbojets inevitably leads designers to make the diameter of the fan larger than the diameter of the turbojet core.

The main result of friction encountered is to reduce global performances of the aircraft and to cause premature engine wear, which is naturally harmful to the life of the engine.

Note also that other engine bending phenomena can occur due to gusts and could cause friction between the rotating blades of the compressor and the turbine and the engine central casing, and for example may be applied vertically or horizontally.

The two C-shaped covers only form a discontinuous envelope around the turbojet, which does not give high performance acoustic insulation due to the discontinuity of the observed treatment, while the need to reduce noise on the downstream side the engine fan is an increasingly stringent concern.

OBJECT OF THE INVENTION

Therefore, the purpose of the invention is to propose an aircraft engine assembly that at least partially corrects the disadvantages mentioned above related to embodiments according to prior art, and also to present an aircraft with at least one such assembly.

To achieve this, the purpose of the invention is an aircraft engine assembly comprising a turbojet, a turbojet attachment pylon and a nacelle mounted on the attachment pylon and surrounding said turbojet, said nacelle comprising at least one mobile nacelle portion forming a single-piece envelope all around a section of the turbojet, said mobile nacelle portion being installed free to slide on said attachment pylon so that it can be displaced in the aft or the forward direction. Furthermore, said mobile nacelle portion has an annular wall delimiting the inner part of an annular secondary flow channel, and an annular wall delimiting the outer part of the annular secondary flow channel.

In other words, the invention discloses a mobile nacelle portion forming a continuous envelope covering 360° around a section of the turbojet, this mobile nacelle portion being displaceable by sliding relative to the attachment pylon, for example to enable access to turbojet equipment during maintenance operations.

The special form of this mobile nacelle portion has several advantages, including that it is capable of resisting higher forces than can be resisted by the assembly of two articulated C-covers encountered in prior art. Therefore, the invention provides a genuine solution to the problem of turbojet deformation, given that the high stiffness of the mobile nacelle portion contributes to limiting these deformations.

Consequently, this reduces bending of the turbojet and therefore generates a significant reduction in the potential friction between the rotating blades of the compressor and the turbine and the central casing of the engine. In particular, the reduction in bending makes it possible to apply smaller nominal clearances between the blades and the casing, which advantageously results in a gain in the global performance of the aircraft and a significant limitation to losses of efficiency.

Furthermore, the continuous nature of this mobile nacelle portion covering 360° around a cross section of the turbojet advantageously results in better acoustic insulation than was possible in the past with the assembly of two C-shaped covers, because there is no longer any discontinuity of material around the hoop direction of the nacelle. In particular, the wall(s) of the mobile nacelle portion may be provided with an acoustic lining that extends continuously or almost continuously around 360°, further improving the reduction in noise escaping from the nacelle.

The nacelle thus made can also facilitate maintenance due to the simplicity of its dynamics for a mass less than the mass of nacelles known according to prior art, particularly due to the elimination of some fixing elements such as compression rods and hinges. In this respect, note that the adopted sliding mechanism provides a complete solution to the problem of constraints against opening covers articulated to the aircraft wing, that occurs in prior art.

For information, one application of this invention includes the case in which all engine attachments are placed on the fan casing, which in particular releases the entire aft part of the engine, making it easier to slide the mobile nacelle portion without interference. In other words, in such cases forces generated by the turbojet are resisted entirely on the fan casing through all engine attachments, so that the central casing of this turbojet is no longer directly connected to the attachment mass by one or more aft attachments. This special arrangement of engine attachments also induces a significant reduction in bending encountered at the central casing, regardless of whether this bending is due to thrusts generated by the turbojet or to aerodynamic loads such as gusts that could be encountered during the various flight phases of the aircraft.

Providing engine attachments on the fan casing makes it possible to create a large spacing between them. This large spacing has the advantage that it considerably simplifies the design of these engine attachments, because the forces that they need to resist to create a moment about a given axis are naturally smaller than they would be for solutions in which the engine attachments located on the central casing are closer to each other.

Preferably, the plurality of engine attachments is composed of a first engine attachment and a second engine attachment arranged to make them symmetrical about a plane defined by a longitudinal axis of the turbojet and a vertical direction through the turbojet, and a third engine attachment through which this same plane passes.

In this configuration, it would then be possible that the first, second and third engine attachments are fixed onto a peripheral annular part of the fan casing, which means that they can occupy positions in which they are advantageously very far from each other.

Preferably, said annular wall that delimits the annular secondary flow channel in the inside, and the wall that delimits the annular secondary flow channel on the outside, are each equipped with an acoustic protection lining.

The noise reduction due to the secondary flow through the mobile nacelle portion can be further improved by making each acoustic protection lining continuous around the entire associated annular wall, namely over 360° without any discontinuity.

Preferably, said nacelle also comprises a fixed nacelle portion forming a single piece envelope all around a section of the turbojet, said fixed nacelle portion being fixed on the turbojet, for example built onto an intermediate casing of the turbojet. Furthermore, said fixed nacelle portion forms an internal radial support for said mobile nacelle portion.

Thus, by resting on the fixed nacelle portion attached directly to the engine, the efficiency of the mobile nacelle portion acting in its function to limit turbojet deformations due to resistance of forces, is very much increased.

It is even further increased when an aft end of a turbojet fan casing also acts as an internal radial support for this nacelle portion.

In this case, it would be possible that the inner radial supports could be annular supports, for example formed by a conical generating line, particularly such that the mobile nacelle portion is loaded essentially by vertical and transverse pressure forces as it resists deformation of the turbojet.

Consequently, when the mobile nacelle portion is closed, preferably by sliding it forwards, two annular supports are created, for example one on the aft flange of the fan casing and the other on the fixed nacelle portion radially inside the mobile portion. These supports may be designed to be more or less rigid, depending on the required stiffnesses and tolerances.

Furthermore, two bolts could be placed on the two side ends of the turbojet, namely at 3 o'clock and at 9 o'clock on a horizontal plane of symmetry of the turbojet, to block the portion free to move longitudinally relative to the fan casing during the aircraft flight phases. The advantages of these positions are that they are symmetrical, and especially are very easily seen and accessible from the ground.

Preferably, said fixed nacelle portion comprises one or several access doors to turbojet equipment, conventionally provided in an annular space called the nacelle compartment.

Also preferably, the portion of the mobile nacelle can slide relative to the attachment pylon due to a slide provided on one of these two elements, said slide following a very slightly curved line, arranged along an approximately longitudinal direction of the engine assembly.

More generally, it is indicated that the slide defines a trajectory, preferably close to the horizontal, optimised to facilitate the separation of elements present and to adapt to the shapes of the pylon and other elements of the engine assembly. Nevertheless, the slide may be of any other form that is not horizontal or near horizontal, without going outside the framework of the invention.

Finally, said mobile portion is designed so that it can be moved in the aft direction from a normal flight position into a maintenance position in which it allows access to turbojet equipment, and vice versa. If the turbojet is equipped with a thrust reverser system, the thrust reverser system can be supported by the engine fan casing and aft from the fan casing. It could then be a known "petal" or "crocodile clip" type of system, although a system comprising LRUs (Line Replaceable Units) could also be used, installed on the aft side of the fan casing. In such a case, the thrust reverser system is made to operate by pushing the mobile nacelle portion along the slide by the value necessary to deploy the petals or equivalent devices, that then become capable of transferring pressure forces directly onto the fan casing.

Note that sliding the mobile portion can strongly disturb flows aft from the engine, including the primary flow, consequently generating. drag and loss of thrust that are quite beneficial in improving ,he braking efficiency of the aircraft.

Therefore, is generally preferable to provide a thrust reverser system on the aft side of the fan casing and supported by the fan casing, said thrust reverser system being housed in said mobile nacelle portion when said mobile nacelle portion is in a normal flight position.

Another purpose of the invention is an aircraft comprising at least one engine assembly like the assembly that has just been presented.

Other advantages and characteristics of the invention will appear in the detailed non-limitative description given below.

BRIEF DESCRIPTION OF THE DRAWINGS

This description will be made with reference to the appended drawings among which;

FIG. 3a shows a schematic view similar to that shown in FIG. 3, with the mobile nacelle portion shown in an intermediate position between its forward position and its aft position;

FIG. 3b shows a sectional view along line IIIb-IIIb in FIG. 3a;

DETAILED DESCRIPTION OF PREFERRED EMBODIMENTS

Figure 1:
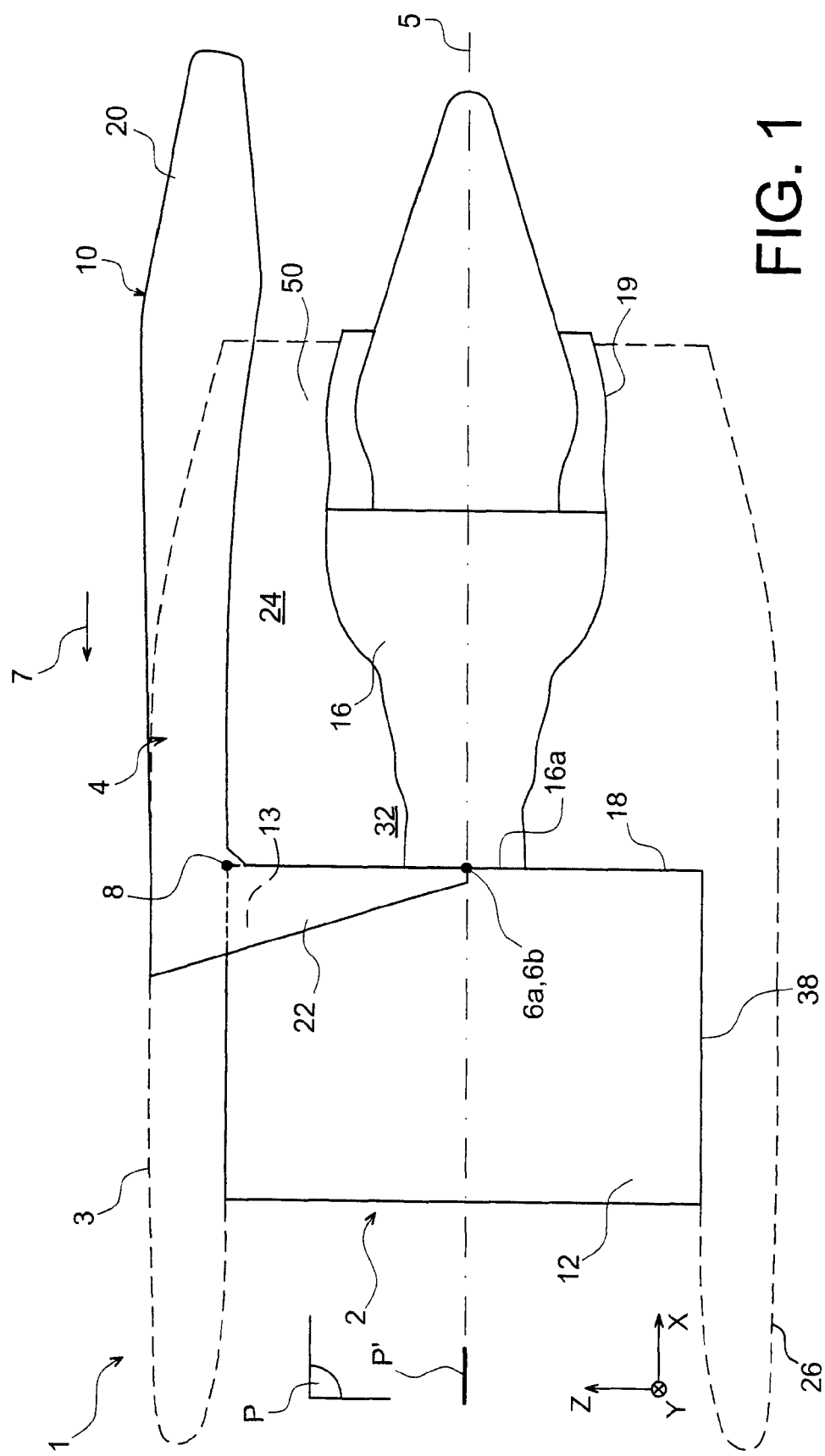
FIG. 1 shows a side view of an aircraft engine assembly according to a preferred embodiment of this invention.

FIG. 1 shows an engine assembly 1 for an aircraft according to a preferred embodiment of this invention, this assembly 1 being designed to be fixed under an aircraft wing (not shown).

Globally, the engine assembly 1 comprises a turbojet 2, a nacelle 3 shown diagrammatically in dashed lines, an attachment pylon 4, and a plurality of engine attachments 6a, 6b, 8 fixing the turbojet 2 under this pylon 4 (the attachment 6b being hidden by the attachment 6a in this FIG. 1). Note for information that the attachment pylon 4 comprises another series of attachments (not shown) used to suspend this assembly 1 under the aircraft wing.

In the following description, by convention X is the direction parallel to a longitudinal axis 5 of the turbojet 2, also corresponding to a longitudinal direction of the engine assembly and the pylon, Y is the transverse direction for this same turbojet 2 also corresponding to a transverse direction of the engine assembly and the pylon, and Z is the vertical direction or the height, these three directions being orthogonal to each other.

The terms "forward" and "aft" should also be considered relative to a direction of movement of the aircraft caused by the thrust applied by the turbojet 2, this direction being shown diagrammatically by the arrow 7.

FIG. 1 shows that only a rigid structure 10 of the attachment pylon 4 is shown. The other components of this pylon 4, not shown, such as the secondary structure that segregates systems and holds them in place while supporting aerodynamic fairings, are conventional elements identical to or similar to what are found in prior art, and known to those skilled in the art. Consequently, no detailed description will be given of them.

Furthermore, the turbojet 2 is provided with a large fan casing 12 at the forward end delimiting an annular fan duct 13, and it comprises a smaller central casing 16 towards the aft end, enclosing the core of this turbojet. A forward annular end 16a of the central casing 16 supports fixed blades extending in the radial direction, and connecting the same central casing to the fan casing 12 through their ends. For guidance, this forward end 16a is also called the intermediate casing of the turbomachine.

Finally, the central casing 16 extends in the aft direction along an ejection casing 19, the above-mentioned casings obviously being fixed to each other. As can be seen from the above, it is preferably a turbojet with a high dilution ratio.

As can be seen in FIG. 1, in this preferred embodiment, there are preferably three engine attachments 6a, 6b, 8, and they are all fixed onto the above-mentioned fan casing 12.

Figure 2:
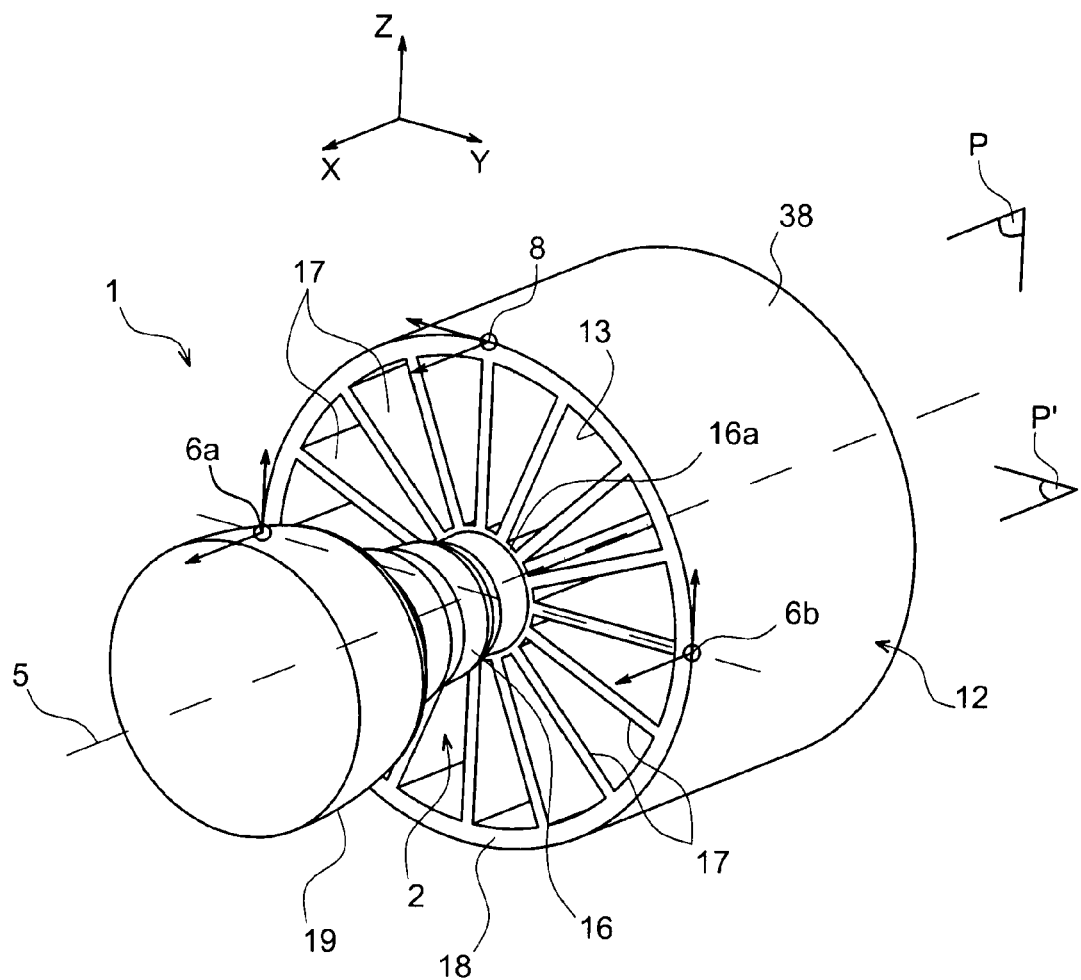
FIG. 2 shows a diagrammatic perspective view of the assembly shown in FIG. 1, the attachment pylon and the nacelle having been removed to more clearly show the position of the engine attachments.

FIG. 2 shows that the first attachment 6a and the second attachment 6b shown diagrammatically are arranged symmetrically about a first vertical plane P defined by the longitudinal axis 5 and the Z direction.

More precisely, both of the attachments 6a and 6b are fixed onto a peripheral annular part 18 of the fan casing 12, and preferably to the back of this part 18 as is shown diagrammatically.

It can then be arranged for the first and second engine attachments 6a, 6b to be diagrammatically opposite on the peripheral annular part 18 that has an outer cylindrical surface 38 of the fan casing 12, such that a second plane P' defined by the longitudinal axis 5 and the Y direction passes through these attachments 6a, 6b.

As can be seen diagrammatically by the arrows in FIG. 2, each of the first and second engine attachments 6a, 6b is designed so that it can resist forces generated by the turbojet 2 along the X direction and along the Z direction, but not the forces applied along the Y direction.

In this manner, the two attachments 6a, 6b are at a large distance from each other and jointly resist the moment applied along the X direction and the moment applied along the Z direction.

FIG. 2 also shows that the third engine attachment 8 shown diagrammatically is also fixed onto the peripheral annular part 18 of the fan casing 12, also preferably on the aft end of this part 18.

For information, note that the attachments 6a, 6b, 8 are fixed to the peripheral annular part 18 of the casing 12 through structural parts (not shown) of the engine, that are preferably effectively arranged on the aft part of the peripheral annular part 18. Nevertheless, it is also possible that engines could be used in which the structural parts are located further towards the forward end of the peripheral annular part 18, such that the attachments 6a, 6b, 8 will also be fixed further towards the forward end of the engine, always on the peripheral annular part 18 of the fan casing 12.

The third attachment 8 is located on the highest part of the fan casing 12, and therefore on the highest part of the peripheral annular part 18, and consequently the first plane P mentioned above fictitiously crosses through it.

As shown diagrammatically by the arrows in FIG. 2, the third engine attachment 8 is designed so that it can resist forces generated by the turbojet 2 along the X and the Y directions, but not forces applied along the Z direction.

Thus, this third attachment 8 and the two attachments 6a, 6b jointly resist the moment applied along the Y direction.

Note that the engine attachments 6a, 6b, 8 are shown diagrammatically in FIGS. 1 and 2, it should be understood that these attachments can be made in any form known to those skilled in the art, for example that used for the assembly of shackles and fittings.

The main advantage related to this configuration that has just been described lies in the fact that complete freedom of the central casing 16 relative to engine attachments 6a, 6b, 8 considerably reduces bending of this casing during the various aircraft flight situations, and therefore significantly reduces wear due to friction between the compressor and turbine blades in contact with this central casing 16. Furthermore, as will be described below, this configuration in which the aft part of the turbojet does not have any engine attachments makes it possible to initiate a sliding movement of part of the nacelle.

Referring once again to FIG. 1 in which the nacelle 3 is only shown diagrammatically in dashed lines, it can seen that the rigid structure 10 of the pylon, designed so as to be symmetric about the first plane P mentioned above, comprises a central torsion box 20 that extends from one end of the structure 10 to the other in the X direction, parallel to this direction. For guidance, this box 20 may be formed by the assembly of two lateral spars extending along the X direction in parallel XZ planes, and connected to each other through cross ribs oriented along parallel YZ planes.

Furthermore, two lateral structures 22 are arranged forward from the box 20 and on each side of it (only one is visible because the figure shows a side view), designed to carry fasteners 6a and 6b respectively at their bottom ends. For guidance, these two lateral structures 22 may also be in the form of an add-on box at the forward end and laterally on the box 20, without going outside the framework of the invention.

Furthermore, although it has not been shown, the elements 22, 22 taken jointly can delimit part of a fictitious approximately cylindrical surface with a circular section and a longitudinal axis parallel to the central box 20. In other words, the curvature of the lateral structures 22 is preferably adapted so that it can be positioned around and in contact with this fictitious surface, over their entire length. Thus, in general, the rigid structure 10 forms a portion of an approximately cylindrical envelope/cage with a circular section that can be positioned around and at a distance from the central casing 16 of the turbojet 2.

The diameter of the fictitious cylindrical surface is preferably approximately the same as the diameter of the outer cylindrical surface 38 of the annular part 18 of the fan casing 12, to minimise possible disturbance to the secondary flow escaping from the annular fan duct 13, entering into the annular secondary flow channel reference 24 in FIG. 1.

The nacelle 3 surrounding the turbojet comprises a forward part with an air intake 26, this conventional designed forward part extending as far as the aft end 18 of the fan casing 12. The aft part of the nacelle, that starts from the previously mentioned aft end 18, is specific to this invention and will now be described with reference to the following figures.

Figure 3:
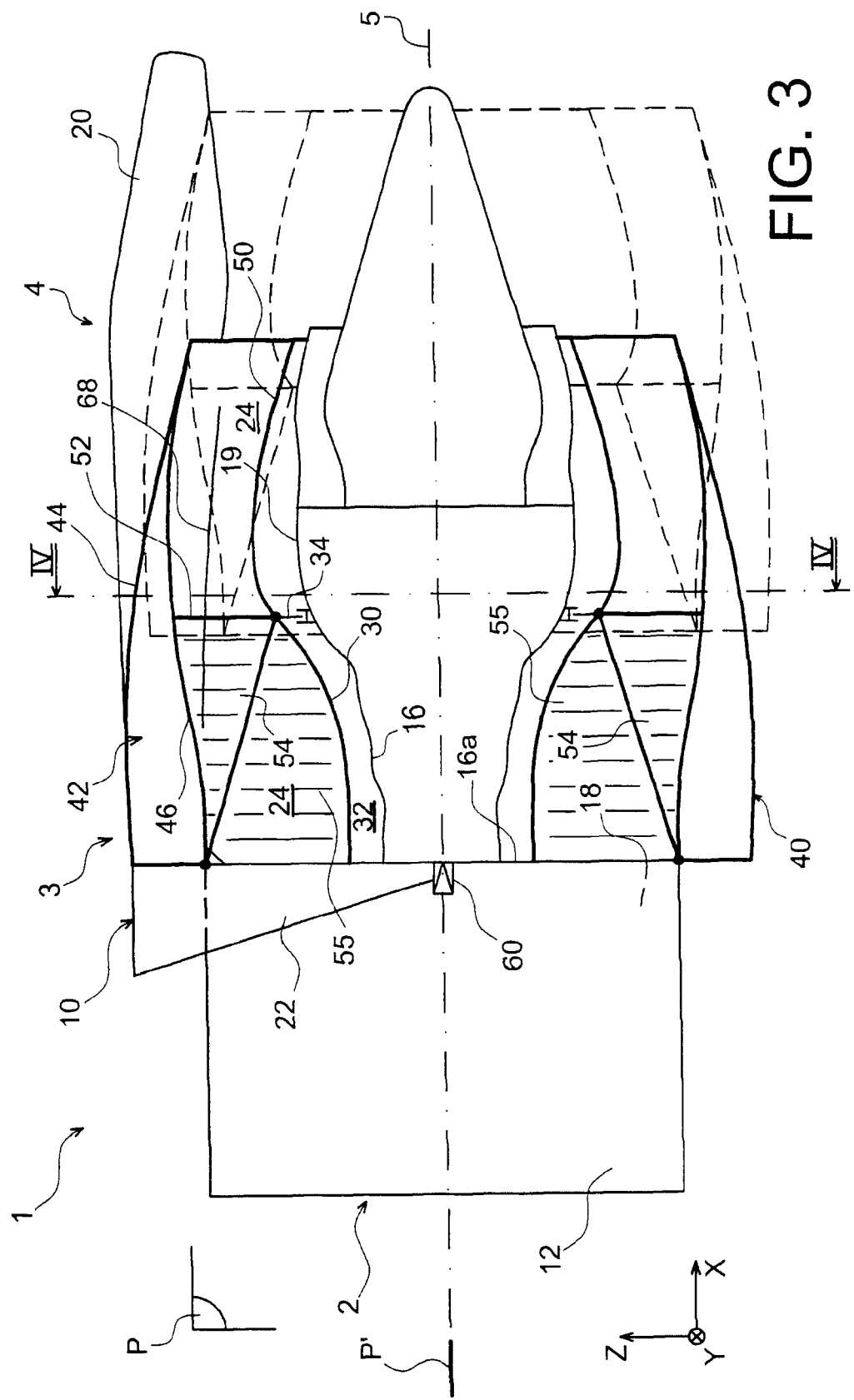
FIG. 3 shows a view similar to that shown in FIG. 1, showing details of the aft part of the nacelle, the motile nacelle portion being shown in its forward position in solid lines, and in its aft position in dashed lines.
Figure 4:
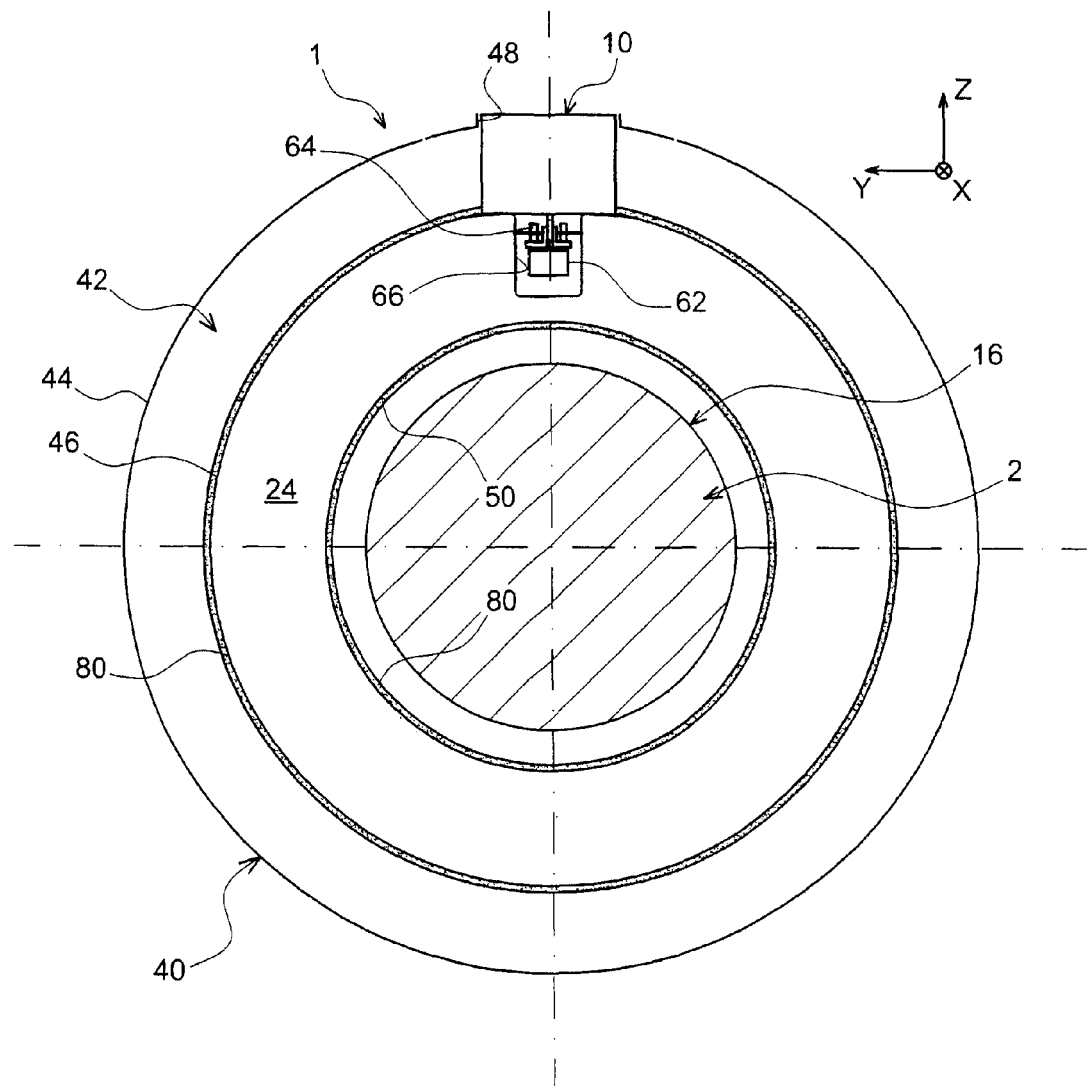
FIG. 4 shows a sectional view along line IV-IV in FIG. 3.

With reference to FIGS. 3 to 4, it can be seen that the aft part of the nacelle 3, extending from the aft end 18 of the casing 12, comprises firstly a fixed annular nacelle portion 30 forming a single piece envelope all around a section of the turbojet, and more precisely around the central casing 16. This fixed portion 30 is built into the intermediate casing 16a, and extends in an annular manner towards the aft direction following the profile of the central casing 16, with which it defines an annular space 32 usually referred to as the nacelle compartment, in which a plurality of equipment (not shown) is located. Furthermore, the fixed portion 30, radially delimiting the nacelle compartment 32 on the outside, comprises one or several access doors (not shown) to turbojet equipment, for example installed on hinges.

The aft end of the fixed portion 30 is supported by a ring 34 supported on the central casing 16, for example this ring 34 that overcomes the thermal expansion of the turbojet being made from rings and radial rods connecting these rings.

The fixed portion 30 also radially delimits the forward part of the annular secondary flow channel 24 towards the outside, extending the annular fan duct 13 in the aft direction.

One of the special features of this invention lies in the presence of a mobile nacelle portion 14 shown in FIG. 3 in solid lines in its normal flight position, and dashed lines in is maintenance position.

In its normal flight position, the mobile nacelle portion 40 extends approximately from the end of the casing 12 as far as the aft end of the nacelle, and forms an envelope around the fixed part 30. More precisely, the mobile portion 40 forms a single-piece envelope around an entire section of the turbojet, and therefore this section is initiated from the intermediate casing 16a or the aft end 18 of the fan casing 12, and which extends as far as the ejection casing 19. As will be described in detail later, the portion of the mobile nacelle 40 is specific in that it is mounted free to slide on the rigid structure 10, so that it can be moved from the forward position to the aft direction, and vice versa.

The mobile portion 40 firstly has an outer annular envelope 42 delimited on the outside by an outer aerodynamic nacelle surface 44, and on the inside by an annular wall 46 providing the external delimitation of the annular secondary flow channel. Towards the forward end, the surface 44 and the wall 46 are radially separated from each other and extend in the aft direction becoming progressively closer to each other, until they come into contact as shown at the aft part of the mobile portion 40. FIG. 4 shows that this envelope 40 is provided with a longitudinal recess 48 at its upper end, to house the rigid structure 10.

Furthermore, the moving portion 40 centred on the axis 5 in the normal flight position comprises an annular wall 50 delimiting the inner surface of the annular secondary flow channel, and therefore located radially inwards from the wall 46. The two walls 46, 50 are rigidly connected to each other by means of a rim 52, which may for example be in the form of a plurality of radial arms at a circumferential spacing from each other, and arranged such that the secondary flow can pass between them without generating excessively restrictive aerodynamic disturbances. Thus, the aerodynamically shaped radial arms 52 connecting the walls 46 and 50 are located in a transverse plane YZ close to or coincident with the plane of the ring 34, so that the inertia forces generated by engine masses can be captured at the source, these forces for example returning directly into the pylon from the mobile portion 40 through a pair of spigots (not shown) located in this same YZ plane, and on each side of the rigid pylon structure.

With reference more specifically to FIGS. 3, 3a and 3b, the longitudinal stiffness of the mobile portion 40 is also reinforced by the presence of longitudinal radial walls forming branches, these walls being referenced 54 and 55. For example, the walls 54, are placed at the upper end and at the lower end relative to the fixed part 30, namely at positions referred to at 6 o'clock and 12 o'clock. They are made in XZ planes, and are sufficiently narrow to minimise drag. Furthermore, the walls 54 supported by the envelope 40 could be arranged such that their trailing edge is kept coincident, or forward from the outer trailing edge of the nacelle.

These walls 54, 55 are coincident in pairs, and are therefore carried by the mobile envelope 40 and the fixed part 30 respectively. They are provided with complementary shaped facing edges, such that they are matched in pairs when in the flight position. FIG. 3b shows that the annular wall 46 can carry two longitudinal radial walls 54 at a slight circumferential separation from each other at its upper radial part at 6 o'clock, these two walls 54 being designed to cooperate with two longitudinal radial walls 55 respectively facing them and also starting from the fixed annular wall 30.

A similar arrangement of the walls 54, 55 could be provided at the lower radial end of the fixed part 30, at 12 o'clock, as shown in the side view in FIG. 3.

Thus, when the mobile portion 40 is in its normal flight position, the annular secondary flow channel 24 is radially delimited on the outside starting from the end wall 18 of the fan casing, only by the outer wall 46 as far as the aft end of the nacelle, while it is radially delimited in the inside starting from the end 18 of the fan casing, by the fixed portion 30 followed by the inner wall 50 that is aerodynamically continuous with this same portion.

In this respect, the forward end of the inner wall 50 is supported on the aft end of the fixed portion 30 which thus forms an inner annular radial support for the mobile portion 40. The annular contact created between the two elements is adjacent to the support ring 34, to achieve better transfer of lateral and vertical forces from the turbojet towards the nacelle, in order to limit its bending. Thus, forces pass successively and approximately in the same YZ transverse plane through the casing 16, the ring 34, the fixed portion 30, the annular contact mentioned above, the radial arms 52 forming rims, and spigots added onto the rigid structure of the pylon.

In the same way, the forward end of the wall 46 is supported on the annular end 18 of the fan casing, thus forming another annular support flange for the mobile portion 40 shifted forwards. Once again, being supported on the fan casing, the efficiency of the mobile nacelle portion 40 in its function to limit turbojet deformations by resisting vertical and transverse pressure forces, is very much increased. It is even further increased by the fact that in this position, the above-mentioned walls 54, 55 are in contact in pairs through their corresponding edges, as shown in FIG. 3.

Consequently, when the mobile nacelle portion 40 is closed by displacing it by sliding it forwards as described below, two annular supports are created that can be designed to be more or less rigid depending on the required stiffnesses and tolerances. Linear supports are also created between the longitudinal edges of the above-mentioned walls 54, 55 facing each other in pairs.

Furthermore, two bolts 60 for example located on the lateral ends of the turbojet, namely at 3 o'clock and at 9 o'clock in the P' plane and symmetrically about the P plane, are provided that have the advantage being highly visible and easily accessible from the ground, so as to block the mobile portion 40 in its normal flight position, in other words longitudinally in line with the fan casing 12 and the pylon 4. As shown, the bolts 60 (only one bolt is shown in FIG. 3 because it is a side view) can be arranged fixed to the lower ends of the two side boxes 22 of the rigid structure, without going outside the framework of the invention.

Consequently, the mobile portion 40 is held in the three directions X, Y and Z, noting the possibility of attaching longitudinal pins onto the mobile portion 40 that can automatically penetrate into the corresponding orifices formed in the fan casing 12 or the rigid structure 10 as it is displaced towards its normal flight position.

This displacement is achieved by means of a slide 62 provided on the rigid structure of the attachment pylon, also called the primary structure, this slide 62, for example in the form of a rail, cooperating with pads 64 carried by the mobile portion 40 as shown in FIG. 4, although the opposite solution could be envisaged without going outside the framework of the invention.

The slide 62 is then arranged in a longitudinal recess 66 formed in the upper part of the outer wall 46 and also housing the pads 64 carried by this wall 46, the slide following a very slightly curved line reference 68 in FIG. 3, oriented approximately along the X direction. More generally, the slide 62 defines a line/trajectory 68 close to the horizontal, but optimised to facilitate separation of the elements present and to adapt to the shapes of the pylon and other elements of the engine assembly. In fact, the adopted slightly curved shape oriented towards axis 5, causes an offset of the mobile portion 40 from this axis 5 when it is moved in the aft direction into its maintenance position shown in dashed lines, the portion 40 being moved downwards from this longitudinal axis 5. In the maintenance position, the mobile single-piece nacelle portion 40 is moved in the aft direction sufficiently to allow access to turbojet equipment through the access doors that become accessible when the portion 40 is withdrawn. In this respect, it is for example arranged such that the mobile portion 40 moves clear until its forward end becomes close to the aft end of the fixed portion 30 as shown in FIG. 3. Furthermore, when the mobile portion 40 is moved in the aft direction, preferably automatically in the same way as it is moved in the forward direction to return to the normal flight position, the portion 40 moves relative to the pylon by longitudinal sliding of the rigid structure in the longitudinal recess 48. Furthermore, movement of the portion 40 is obviously facilitated by the lack of an aft engine attachment, as described above.

This figure clearly shows that the mobile portion 40 forms a single-piece envelope surrounding a cross-section of the turbojet around 360° without any discontinuity. More precisely, the concentric walls 46 and 50 delimiting the secondary flow channel 24 each form a single-piece envelope surrounding a given section of the turboprop around 360° without any discontinuity.

The continuous nature of each wall 46, 50 around 360° very much reduces noise created by the secondary flow in the aft part of the nacelle, this noise being even more attenuated by the addition of an acoustic protection lining 80 made continuously around each of these annular walls 46, 50. In particular, the lining 80 on the outer wall 46 in which the recess 66 is formed on its end, follows the U-shape profile of the recess 66 as it passes from one of the globally C-shaped elements making up the wall 46 to the other, as can be seen clearly in FIG. 4.

Figure 5:
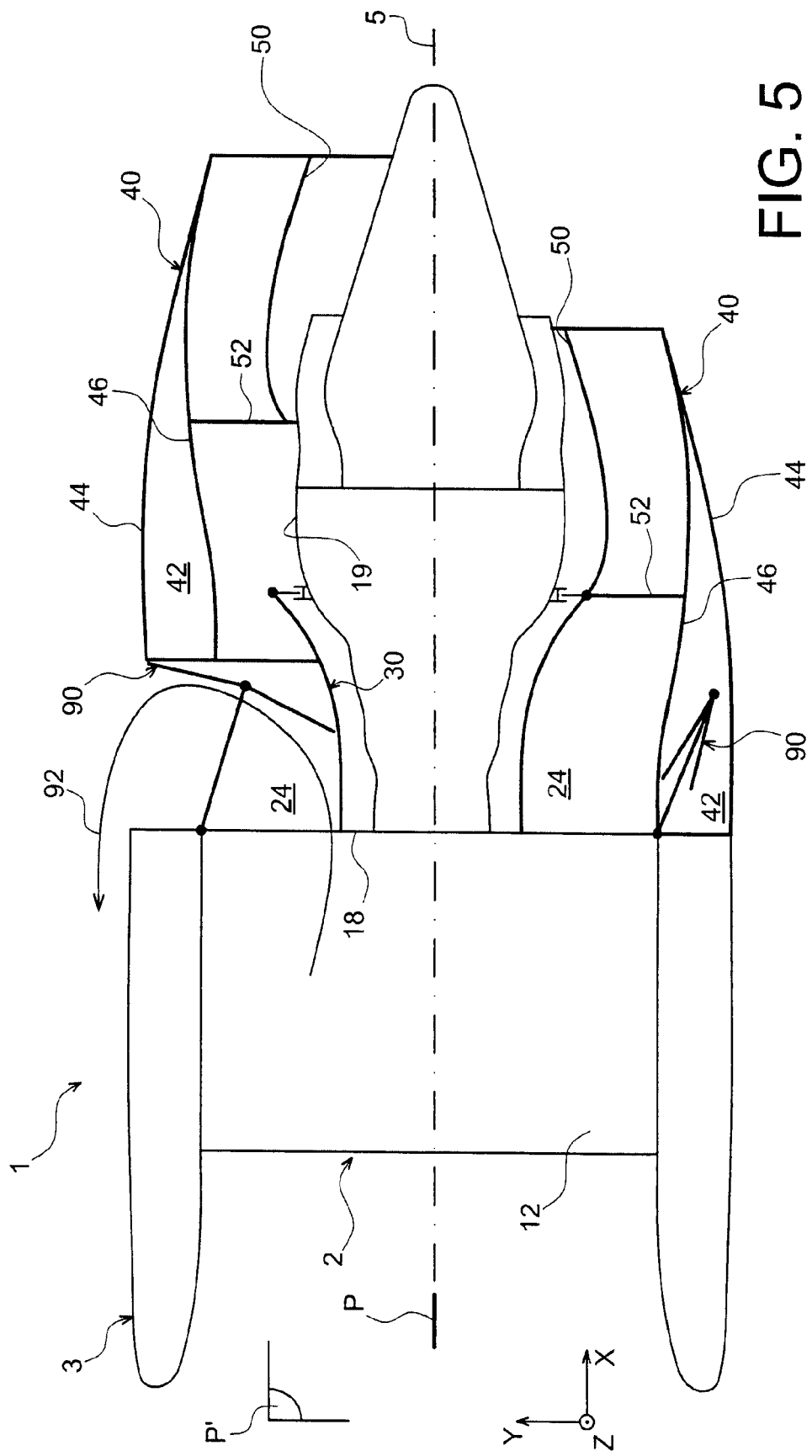
FIG. 5 shows a diagrammatic top view of the aft part of the nacelle shown in the previous figures, incorporating a thrust reverser system.

FIG. 5 shows the aft part of the nacelle incorporating a thrust reverser system 90, the lower half-view showing the system in the retracted configuration with the moving portion 40 in the normal flight position, and the upper half-view showing the system in its deployed configuration with the mobile portion 40 in its position towards the aft end, for example corresponding to the maintenance position in which it allows access to turbojet equipment.

As can be seen in this FIG. 5, the system 90 is preferably carried by the annular end 18 mentioned above of the fan casing 12, and at its aft end. A known type of petal or "crocodile clip" system could be used, although it would also be possible to envisage implanting a system comprising LRU (Line Replaceable Units), installed aft from the fan casing.

In this case, this thrust reverser system 90 is made to function by pushing the mobile nacelle portion 40 along the slide by the value necessary for the petals or equivalent to deploy, which by deploying in the annular secondary channel 24 as shown in the upper half-view, then become capable of transferring pressure forces directly onto the fan casing, thus inverting the direction of the gas flow shown by the arrow 92. More precisely, the petals or "crocodile clips" deployed in the secondary channel 24 can deviate air that can no longer propagates in the aft direction, but is then forced outside the nacelle through contact with the petals, with a strong component in the direction opposite to the aircraft direction of motion.

On the other hand, when the mobile nacelle portion 40 is in its normal flight position, each petal or "crocodile clip" is housed between the annular walls 44, 46 forming the outer annular envelope 42, as shown in the lower half-view. Thus, the reverser system 90 does not create any disturbance to the secondary flow, since it does not penetrate into the annular secondary channel 24. Furthermore, its implantation does not create any discontinuity in the acoustic protection lining 80. Furthermore, the petals or "crocodile clips" move in the same annular space 24 as the space in which the above-mentioned longitudinal walls 54, 55 are located, however the circumferential position of the petals or crocodile clips relative to the walls 54, 55 is adopted such that there is no mechanical interference between them.

Naturally, the deployment controls for the petals or "crocodile clips" and the displacement controls of the mobile portion 40 are sequenced so as to not generate any mechanical interference between these elements, these controls obviously being in addition to control over the bolts 60 allowing/preventing movement of the mobile portion 40.

Obviously, those skilled in the art could make various modifications to the aircraft engine assembly 1 that has just been described as a non-limitative example. In particular although the engine assembly 1 was presented in a configuration that could be suspended under the aircraft wing, this assembly 1 could also be in a different configuration in which it could be mounted above the wing, or even on an aft part of the fuselage, preferably laterally.

The invention claimed is:

1. An aircraft engine assembly comprising:
a turbojet;
a turbojet attachment pylon; and
a nacelle mounted on the attachment pylon and surrounding the turbojet, the nacelle comprising at least one mobile nacelle portion forming a single piece envelope around a section of the turbojet, the mobile nacelle portion being mounted free to slide on the attachment pylon to be moved from a forward position in an aft direction, and vice versa, wherein the mobile nacelle portion comprises an inner annular wall providing an inner delimitation of an annular secondary flow channel, and an outer annular wall providing external delimitation of the annular secondary flow channel.

2. An aircraft engine assembly according to claim 1, wherein the inner annular wall providing inner delimitation of an annular secondary flow channel, and the outer annular wall providing external delimitation of the annular secondary flow channel, each include an acoustic protection lining.

3. An aircraft engine assembly according to claim 2, wherein each acoustic protection lining is made continuously around each corresponding annular wall.

4. An aircraft engine assembly according to claim 1, wherein the nacelle further comprises a fixed nacelle portion forming a single piece envelope around a section of the turbojet, the fixed nacelle portion being fixed on the turbojet, and the fixed nacelle portion forming an internal radial support for the mobile nacelle portion.

5. An aircraft engine assembly according to claim 1, wherein an aft end of a turbojet fan casing forms an internal radial support for the mobile nacelle portion.

6. An aircraft engine assembly according to claim 4, wherein the internal radial support is an annular support.

7. An aircraft engine assembly according to claim 5, wherein the internal radial support is an annular support.

8. An aircraft engine assembly according to claim 4, wherein the fixed nacelle portion comprises one or plural access doors to turbojet equipment.

9. An aircraft engine assembly according to claim 1, wherein sliding of the mobile nacelle portion relative to the attachment pylon is performed using a slide provided on one of the mobile nacelle portion or the attachment pylon, the slide following a curved line arranged along an approximately longitudinal direction of the engine assembly.

10. An aircraft engine assembly according to claim 1, further comprising a thrust reverser system supported by the fan casing and aft from a fan casing, the thrust reverser system housed in the mobile nacelle portion when the mobile nacelle portion is in a normal flight position.

11. An aircraft comprising at least one engine assembly according to claim 1.

* * * * *